United States Patent [19]

Miyata et al.

[11] 4,051,771
[45] Oct. 4, 1977

[54] APPARATUS FOR OBTAINING LUPULIN-RICH PRODUCTS FROM HOPS

[75] Inventors: Junjiro Miyata; Yasushi Kikuchi, both of Fukushima, Japan

[73] Assignee: Asahi Breweries, Ltd., Tokyo, Japan

[21] Appl. No.: 701,092

[22] Filed: June 30, 1976

Related U.S. Application Data

[62] Division of Ser. No. 669,872, March 24, 1976.

[30] Foreign Application Priority Data

Mar. 4, 1976  Japan .................................. 51-23509

[51] Int. Cl.² ............................................. C12B 1/00
[52] U.S. Cl. .......................................... 99/276; 426/11
[58] Field of Search .................... 99/276, 277, 278; 426/444, 312, 319, 518, 519, 478, 481, 11; 241/30, 24; 209/3, 4; 302/17; 195/128, 129, 132, 133

[56] References Cited

U.S. PATENT DOCUMENTS

| | | | |
|---|---|---|---|
| 2,833,652 | 5/1958 | Naatz | 426/444 |
| 3,366,033 | 1/1968 | Bishop | 99/278 |
| 3,378,310 | 4/1968 | Christensen | 302/17 |
| 3,450,023 | 6/1969 | Lenz | 99/278 |
| 3,814,331 | 6/1974 | Ronning | 241/24 |
| 3,989,848 | 11/1976 | Moll | 99/278 |

Primary Examiner—Robert W. Jenkins
Attorney, Agent, or Firm—Blanchard, Flynn, Thiel, Boutell & Tanis

[57] ABSTRACT

A method of obtaining lupulin-rich products from hops, which comprises: subjecting frozen hop cones to coarse crushing by a first crusher equipped with a screen having width of openings in the range of 6 – 15 mm and sieving fragments of crushed hops passing therethrough to obtain a first lot of lupulin-rich product as accumulated beneath the sieve; and then subjecting the portion which passed over the screen of the sieve to recrushing by a second crusher equipped with a screen having narrower openings than that of the first crusher, to wit, a screen having width of openings in the range of 3 – 6 mm, and sieving fragments of recrushed hops passing therethrough to obtain a second lot of lupulin-rich product as accumulated beneath the sieve.

13 Claims, 7 Drawing Figures

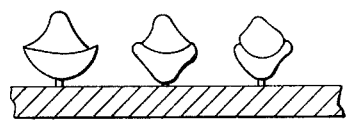
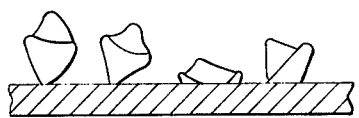
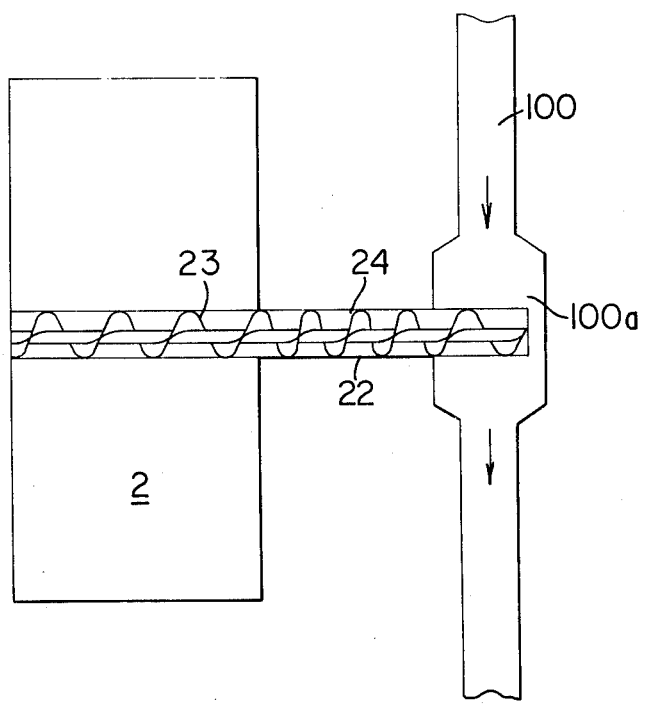

APPARATUS FOR OBTAINING LUPULIN-RICH PRODUCTS FROM HOPS

This is a division of application Ser. No. 669,872 filed Mar. 24, 1976.

BACKGROUND OF THE INVENTION a. Field of the Invention

The present invention relates to a method of obtaining lupulin-rich products from hops, and particularly it relates to a method comprising a process step of subjecting hop cones in the frozen state to coarse crushing and sieving the thus crushed hops thereby to obtain a lot of hops with high concentration of lupulin as accumulated beneath the sieves, and a step of recrushing the portion which passed over the screen in the foregoing step into finer fragments and sieving the thus recrushed hops thereby to obtain another lot of hops rich in lupulin as accumulated beneath the sieve.

b. Description of the Prior Art

As is well known, hops are indispensable for the purpose of imparting the characteristic aroma and bitter taste to beer, ale and other brewed beverages. The term hop means the mature cone of the female flower of a plant belonging to mulberry. The substance to which the characteristic aroma and bitter taste are attributable is contained in the lupulin gland which grows at the base of bracteoles and stipular bracts or ovaries when the cone ripens; other portions of bracts or portions of stalks do not contain any contributive ingredients. Brewing of beer and the like is performed throughout the year, while the harvest of hops is seasonally limited. Therefore, it is necessary to preserve hops over a long period of time so that there are required large size storage equipment as well as the greatest circumspection to prevent change in quality. As the counter-measures, there have been proposed and put into practice some methods of concentrating lupulin by processing hops to divide them into portions rich in lupulin and portions not containing lupulin. For example, in U.S. Pat. No. 2,833,652 there is disclosed a method of subjecting lupulin to freezing, coarse crushing and thereafter sieving. According to this method, however, the crushing is carried out relatively coarsely, and therefore, although a concentration of lupulin can be effected, the volume of yield is not satisfactory. Besides, the method in this U.S. Patent seems to be based on experiments conducted by using mainly fresh hops; but the hops to be dealt with in general hop manufactories are dry hops, so that this method is not opposite as regards the dry hops. Granting that the method of this U.S. Pat. does not exclude the processing of dry hops, yet no particular descriptions thereof have been made therein. Meanwhile, with a view to increasing the yield of concentrated hop and degree of concentration, a method of subjecting hops in the frozen state to crushing into fragments finer than that in the foregoing method of U.S. Patent, followed by sieving, has been disclosed in German Pat. No. 1234656: however, when hops are crushed to such extent of fineness as is taught therein, the luplulin-rich portions and the crushed bracts as well as the stalks are fairly approximate in gravity, so that it is infeasible to achieve a sufficient separation effect by blow-sifting or sieving. And, in order to increase the volume of yield, sieving must be conducted repeatedly. Besides, when increase of the volume of yield is attempted, the degree of concentration will decrease.

SUMMARY OF THE INVENTION

The present invention relates to an improvement of the prior art method of concentrating lupulin through the process of subjecting hops in the frozen state to crushing followed by sieving. The principal object of the present invention is to provide a method of highly concentrating lupulin at a very high yield without causing deterioration of the quality of lupulin, coupled with an apparatus for use in practicing said method. Another object of the present invention is to reduce the cost of storage equipment and minimize deterioration of the quality of product during storage. A further object of the present invention is to obtain separately two types of products of different lupulin concentrations thereby rendering it possible to change the mixing ratio of said two types of products appropriately and facilitate regularizing the quality of lupulin to be added at the time of brewing as far as possible. Still further objects of the present invention will be readily understood with reference to descriptions to be made later on.

BRIEF DESCRIPTION OF THE DRAWING

In the appended drawings:

FIG. 1A illustrates lupulin in its normal shape and FIG. 1B illustrates deformed lupulin;

FIG. 3 illustrates the means for supplying material hops to a storage tank;

Referring to FIG. 1 illustrating this lupulin on an enlarged scale, said lupulin is formed on a pedestal secreting lupulin which is produced with ripening of the cone (this pedestal corresponds to the tiny cup shaped portion in the drawing), and normally it is present in the state of being heaped up in the bowl as shown in FIG. 1A. Laboratory measurement of the content of lupulin is usually conducted on hops having lupulin in such normal conditions. But, in the case of on-site operation, the material hops contain about ten-odd % of unripe hops and/or cones with scanty lupulin ascribable to squashing or deformation of lupulin or sticking thereof to bracts in the course of harvest, drying transportation, etc. or immaturity of flowers. FIG. 1B is illustrative of lupulin obtained under irregular conditions.

Figure 2:
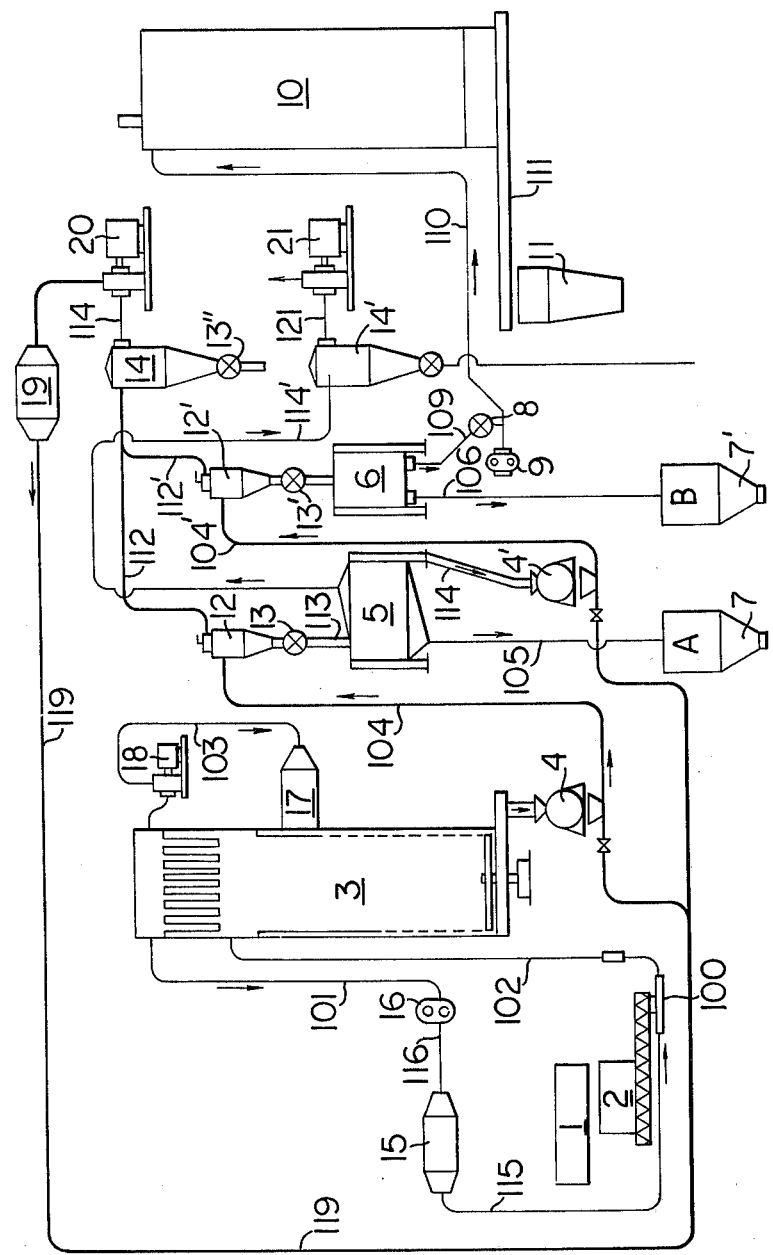
FIG. 2 is a schematic representation of an apparatus which may be utilized in practicing the method of the present invention.

The method proposed in the foregoing U.S. Patent is likely to have been based on the result of concentration conducted on the assumption that lupulin of hops is always in such conditions as shown in FIG. 1A, as attested to by the fact that the sieving is effected upon crushing hops into rather coarse fragments. According to this method, it is admittedly possible to reap normal lupulin almost completely, yet it is difficult to reap deformed or immature lupulin, and accordingly, the yield as a whole comes to be low even though the purity of product may be high. In order to reap such lupulin as illustrated in FIG. 1B completely, hops must be finely crushed as taught in the aforesaid German Patent, but crushing of the hops into fine pieces would not only result in destruction of normal lupulin per se but also breakdown bracts, stalks, etc. into fine fragments, whereby each fragment comes to have a great surface area and these fragments are difficult to separate from one another, so that even after repetition of a sieving operation the product would contain much impurities and the concentration rate would decrease. Meanwhile, as to the relationship between the degree of concentration and the volume of yield, relative to the increase of lupulin content in hops, the rate of decrease in volume is by far great. For instance, in the case where lupulin is concentrated twofold, the volume of yield decreases to less than one half, not to one half. When the degree of concentration is further increased, for instance, to be as much as threefold as in the case of the present invention, the volume of yield sharply decreases to less than one fifth, and as a result, the storage equipment can be modified accordingly.

The present invention is intended to provide a method which will satisfy contradictory requirements such as seen in the aforesaid U.S. Patent and German Patent simultaneously, and has succeeded therein.

According to the present invention, frozen hops are first coarsely crushed to such an extent as will not destroy the normal lupulin, and then sieved. According to this process, the greater part of normal lupulin is concentrated and reaped. Subsequently, the siftings left on the sieves are further finely crushed thereby to separate lupulin still adhering to bracts or deformed lupulin, unripe lupulin of small size, etc. that failed to be separated in the initial treatment are also separated in this step. When sieving is efffected next, as lupulin separated through the second crushing is obviously different in gravity from the other hop fragments of, it can be easily sorted by sieving and recovery of deformed lupulin also can be performed satisfactorily.

Therefore, according to the present invention, the drawbacks of the prior art disclosed in said U.S. Patent and German Patent can be perfectly overcome, and a high yield as well as a high concentration rate can be realized, achieving an economical merit that the volume of the product is much lessened.

Inasmuch as hops are cultivated plants, the condition of the cones thereof depends on the region wherein the hops are cultivated, the species, and the natural conditions such as weather, and therefore it is not uniform in a broad sense. However, as the processing of hops at hop manufactories is actually carried out on the hops of specific species harvested under the same crop conditions in a specific region, the degree of crushing of the hops may be determined by the respective hop manufactory concerned. Hops used in the embodiments of the present invention to be described later on are of a variety called 'Shinshu Sosei' grown in Yamanashi Prefecture, Japan, under normal crop condition, and have a water content of about 8 to 12%.

The present inventors used reltively well-selected dry hops, and crushed them with a crusher aquipped with a screen having width of opening of 10 mm, 5 mm, 3 mm, 2 mm and 1 mm, respectively. They examined the relationship between the degree of crushing and the sieving ratio of crushed fragments by sorting said fragments by means of an shaking sieve equipped with each sieve having 40-mesh, 50-mesh or 60-mesh for fragments sized more than 3 mm, an oscillatory sieve equipped with each sieve having 40-mesh, 50-mesh, 60-mesh or 80-mesh for fragments sized 2 mm and a shaking sieve equipped with each sieve having 60-mesh, 80-mesh or 100-mesh for fragments sized 1 mm, thereby obtaining the results shown in Table-1 below. The testing apparatus employed for this examination was as follows.

Table-1.

| | Rate of Concentration | | | |
|---|---|---|---|---|
| | (1) when a hammer mill with a screen having openings of 10 mm in width was used: | | | |
| Sample assorted by mesh of sieve | Weight of lupulin obtained by sieving (g) | Yield ratio of lupulin obtained by sieving (%) | Content of α-acid in air dried hops (%) | Yield ratio of α-acid (%) |
| more than 40-mesh | 37.05 | 69.4 | 1.26 | |
| less than 40-mesh | 16.33 | 30.6 | 15.12 | 84.0 |
| more than 50-mesh | 61.03 | 77.5 | 1.32 | |
| less than 50-mesh | 17.70 | 22.5 | 16.03 | 77.8 |
| more than 60-mesh | 61.21 | 70.1 | 1.26 | |
| less than 60-mesh | 16.15 | 20.9 | 16.48 | 77.6 |

| | (2) when a hammer mill with a screen having openings of 5 mm in width was used: | | | |
|---|---|---|---|---|
| Sample assorted by mesh of sieve | Weight of lupulin obtained by sieving (g) | Yield ratio of lupulir obtained by sieving (%) | Content of α-acid in air dried hops (%) | Yield ratio of α-acid (%) |
| more than 40-mesh | 34.01 | 64.2 | 0.70 | |
| less than 40-mesh | 18.94 | 35.8 | 12.59 | 90.9 |
| more than 50-mesh | 37.50 | 69.6 | 0.79 | |
| less than 50-mesh | 16.41 | 30.4 | 15.56 | 89.5 |
| more than 60-mesh | 35.35 | 70.3 | 0.85 | |
| less than 60-mesh | 14.91 | 20.7 | 16.00 | 88.6 |

(3) when a hammer mill with a screen having openings of 3 mm in width was used:

| Sample assorted by mesh of sieve | Weight of lupulin obtained by sieving (g) | Yield ratio of lupulin obtained by sieving (%) | Content of α-acid in air dried hops (%) | Yield ratio of α-acid (%) |
|---|---|---|---|---|
| more than 40-mesh | 30.35 | 47.0 | 0.62 | |
| less than 40-mesh | 34.19 | 53.0 | 9.48 | 94.5 |
| more than 50-mesh | 33.61 | 58.7 | 0.75 | |
| less than 50-mesh | 23.66 | 41.3 | 11.71 | 91.1 |
| more than 60-mesh | 40.75 | 62.7 | 0.64 | |
| less than 60-mesh | 24.27 | 37.3 | 14.52 | 93.1 |

(4) when a hammer mill with a screen having openings of 2 mm in width was used:

| Sample assorted by mesh of sieve | Weight of lupulin obtained by sieving (g) | Yield ratio of lupulin obtained by sieving (%) | Content of α-acid in air dried hops (%) | Yield ratio of α-acid (%) |
|---|---|---|---|---|
| more than 40-mesh | 30.58 | 40.4 | 0.52 | |
| less than 40-mesh | 45.13 | 59.6 | 8.77 | 96.1 |
| more than 50-mesh | 39.75 | 55.7 | 0.81 | |
| less than 50-mesh | 31.60 | 44.3 | 9.68 | 90.5 |
| more than 60-mesh | 40.43 | 62.2 | 0.88 | |
| less than 60-mesh | 24.57 | 37.8 | 12.32 | 89.4 |
| more than 80-mesh | 53.75 | 67.8 | 1.06 | |
| less than 80-mesh | 25.50 | 32.2 | 13.46 | 87.3 |

(5) when a hammer mill with a screen having openings of 1 mm in width was used:

| Sample assorted by mesh of sieve | Weight of lupulin obtained by sieving (g) | Yield ratio of lupulin obtained by sieving (%) | Content of α-acid in air dried hops (%) | Yield ratio of α-acid (%) |
|---|---|---|---|---|
| more than 60-mesh | 34.33 | 39.0 | 0.60 | |
| less than 60-mesh | 53.75 | 61.0 | 8.32 | 95.5 |
| more than 80-mesh | 46.18 | 53.5 | 1.06 | |
| less than 80-mesh | 40.11 | 46.5 | 10.74 | 89.8 |
| more than 100-mesh | 48.73 | 63.5 | 2.19 | |
| less than 100-mesh | 27.97 | 36.5 | 10.89 | 74.0 |

Testing apparatus:
Hammer mill; with diameter of 20 cm
Sieving screen (cf. p.850 of Hand-Book of Chemical Industry published in 1968 by Maruzen Bookstore)
Mesh: number of openings per linear inch; Standard sieves manufactured by Tyler & Co. are generally used.

| Mesh (No. of openings/linear inch) | Width of sieve's opening nominal size (μ) |
|---|---|
| 36 mesh | 420 μ |
| 42 | 350 |
| 48 | 297 |
| 60 | 250 |
| 70 | 210 |
| 80 | 177 |
| 100 | 149 |

Lupulin consists of various ingredients, of which the percentage of α-acid is substantially fixed quantitatively, so that the degree of concentration of lupulin can be estimated by measuring the content of α-acid. Shown in Table-2 below are the degrees of concentration of lupulin (1) and the yields of lupulin (2) as figured out by applying the following equations respectively.

$$\text{degree of concentration of lupulin} = \frac{\alpha\text{-acid content in sample collected from beneath sieve}}{\alpha\text{-acid content in material hops}}$$

wherein:

α-acid content in material hops =

$$\frac{\text{siftings on sieve} (\alpha\text{-acid content} \times \text{wt.}) + \text{yield beneath sieve} (\alpha\text{-acid content} \times \text{wt.})}{\text{gross weight of (siftings on sieve + yield beneath sieve)}} \times 100$$

yield of lupulin:

yield of lupulin =

$$\frac{\text{yield beneath sieve} (\alpha\text{-acid content} \times \text{wt.})}{\text{siftings on sieve} (\alpha\text{-acid content} \times \text{wt.}) + \text{yield beneath sieve} (\alpha\text{-acid content} \times \text{wt.})} \times 100$$

Table-2

(1) Degree of concentration of lupulin

| Yield assorted by mesh of sieve | | width of openings of hammer mill's screen | | | | |
|---|---|---|---|---|---|---|
| | | 10 mm | 5 mm | 3 mm | 2 mm | 1 mm |
| Yield beneath | 40-mesh sieve | 2.75-fold | 2.54-fold | 1.78-fold | 1.61-fold | — |
| yield beneath | 50-mesh sieve | 3.46 | 2.95 | 2.22 | 2.03 | — |
| yield beneath | 60-mesh sieve | 3.71 | 2.99 | 2.50 | 2.37 | 1.56-fold |
| yield beneath | 80-mesh sieve | — | — | — | 2.66 | 1.93 |

Table-2-continued

| Yield assorted by mesh of sieve | (1) Degree of concentration of lupulin | | | | |
|---|---|---|---|---|---|
| | width of openings of hammer mill's screen | | | | |
| | 10 mm | 5 mm | 3 mm | 2 mm | 1 mm |
| yield beneath 100-mesh sieve | — | — | — | — | 2.02 |

| yield assorted by mesh of sieve | (2) Yield ratio of lupulin | | | | |
|---|---|---|---|---|---|
| | width of openings of hammers mill's screen | | | | |
| | 10 mm | 5 mm | 3 mm | 2 mm | 1 mm |
| yield beneath 40-mesh sieve | 84.1% | 90.9% | 94.5% | 96.1% | — |
| yield beneath 50-mesh sieve | 77.9 | 89.6 | 91.3 | 89.8 | — |
| yield beneath 60-mesh sieve | 77.6 | 88.8 | 93.1 | 85.5 | 95.6 |
| yield beneath 80-mesh sieve | — | — | — | 85.8 | 89.8 |
| yield beneath 100-mesh eive | — | — | — | — | 74.1 |

Judging from the showings in this table collectively, in the case of a screen having width of opening of 10 mm, the concentration of lupulin can be trebled or more, but the yield ratio thereof falls short of 80%. In the case of a screen having width of opening of 5 mm, the concentration of lupulin can be almost trebled, but the yield ratio thereof does not exceed 90%. And, in the case of a screen having width of opening of 3 mm, the concentration of lupulin is no more than 2.5 times, but the yield ratio thereof is as much as 93%.

Based on observations as above, it seems to be practically ideal if the concentration of lupulin can be effected to such a degree as in the case of said screen having a width of opening of 10 mm and the yield ratio thereof can be realized to such an extent as in the case of said screen having width of opening of 3 mm. With this in view, siftings of crushed hops left on sieves of a crusher with a screen having openings of 10 mm in width were further subjected to crushing by a crusher with a screen having openings of 3 mm in width followed by sieving. As a result, about 16% of lupulin could be recovered from said siftings. The present invention has been accomplished on the basis of this experiment.

The foregoing descriptions relate to laboratory tests. In the case of concentrating lupulin on industrial scale, however, the material hops are not always well selected. Therefore, in the following example embodying the present invention, the concentration of lupulin was performed by using a crusher with a screen having opening of 8 mm in width for the initial crushing process and a crusher with a screen having opening of 5 mm in width for the secondary crushing process.

EXAMPLE 1

121.3 Kg of material hops containing 5.64% of α-acid were crushed by a hammer mill with a screen having opening of 8 mm in width and subjcted to initial sieving under the temperature condition of −20° C. The ratio of yield beneath the sieves on this occasion was 24.76% containing 24.6 Kg of α-acid, and the α-acid content in the dust arising from the sieving was 3.60%. When the portion which passed over the screen of the sieve was crushed by a hammer mill with a screen having opening of 5 mm in width and subjected to secondary sieving, 14.0 Kg of product containing 4.07% of α-acid were obtained from beneath the sieves. The amount of hop refuse arising from the secondary sieving was 82.1 Kg, and the α-acid content therein was 0.67%.

When the above showings were reduced by way of the aforesaid equations, the yield ratio of lupulin was as much as 92.4% and the degree of concentration was increased by 2.89 times. Compared with the prior art wherein the degree of concentration is 2.4 times and the yield ratio is practically equal, it will be understood that the volume of the product in the present invention has been very much lessened. As a matter of fact, however, the above referenced numerial values in the prior art have so far been unattainable granting that the method per se is well known.

Next, the present inventors have worked out a design for the plant to practice the present method on the basis of the showings of this example, and have accomplished invention of a relevant apparatus.

Hereunder will be explained particulars of said apparatus, coupled with the conditions for operation thereof.

Illustrations in from FIG. 2 onward relate to an apparatus which may be utilized in practicing the above described method of obtaining lupulin-rich products from hops according to the present invention. The individual machines and implements constituting this apparatus are not particularly novel, but the construction of the apparatus as a whole is unprecedented as an apparatus for practicing a method of this kind. Descriptions hereunder will be made mainly with reference to the appended drawings; in these drawings, however, the structure of the individual machines and implements is not expressly elucidated, but is represented by diagram or reference numeral of less than two figures to denote any specific part of the machines and implements. Further, pipelines interconnecting these machines and implements and other accessory apparatuses are represented by reference numerals of three figures to distinguish them from said machines and implements.

The essential parts of the present apparatus consist of, as shown in FIG. 2, the storage tank 3 for cooled hop cones which is equipped with the feeder disposed on the lower part thereof, the first crusher 4 which is connected to said feeder of storage tank, the cold air conveyor pipe 104 for transferring fragments of crushed hops coming out of the first crusher 4, the first cyclone 12 which is connected to said pipe 104, the second crusher 4′ for the purpose of recrushing the material separated from the first cyclone 12, said crusher 4′ being equipped with a screen having width of opening narrower than that of the crusher 4, the second cyclone 12′ which is connected to the crusher 4′ through the pipe 104′, the sieve 6 for the purpose of sieving hop fragments separated by the second cyclone 12′, and the pipelines 112, 114, 119 for the purpose of returning the exhaust coming out of cyclones to the hop fragments conveying system, with the addition of accessory machines and implements connected to these essential parts. Hereunder will be explained particulars of these parts in due order.

In the drawings, the reference numeral 1 denotes a magnetic separator through which dry hops get rid of pieces of iron and the like and are supplied to the feeder 2. A magnetic hopper is not an indispensable device. The feeder 2 is — as will be elucidated with reference to FIG. 3 later on — in airlocked condition, and it leads to the pipeline 102 for conveying air as usually cooled down to a temperature in the range of from −10° to −40° C, whereby the material hop cones are supposed to be conveyed into the upper part of the storage tank 3. The cold air sent in the air conveying pipeline 102 is drawn out from the top of the storage tank 3, passes through the pipe 101, air blower 16 and pipe 116, is cooled again by the air-cooler 15, and is returned to the pipe 102 via the pipe 115. Accordingly, within the pipe 102, the cold air and the hop cones with the temperature of work-room are mixed together, whereby the hop cones are quenched while the cooling efficiency of said air lessens. In order to making good this decrease of cooling efficiency of air, said air-cooler 15 is installed in the middle of the circulation system for air. The hops led in the conveying pipe 102 is instantly quenched usually to a temperature below −5° C within the pipeline and the moisture contained therein is frozen in the course of conveying.

FIG. 3 is a bird's eye view of a means for conveying the material hops from the hopper to the position of pipeline through a screen conveyor. In this FIG. 3, 2 denotes a hopper, whose bottom face is shown herein, and 22 denotes a screw feeder having an external appearance such that its upper side within the hopper is open while its portion outside the hopper as accommodating the screw is exclusively enclosed in the airtight fashion. The fore end of the feeder opens into the bulged portion 100a of the conveying pipe 100, and the screw pitch 24 of the portion between the hopper and the opening is contracted relative to the other portion 23. Consequently, the hope cones being conveyed by the screw from the hopper are abruptly compressed at this portion with contracted pitch to bring on an airtight condition, whereby the pipeline and the hopper are air-locked thereat. As the pitch of the portion past this air-locked portion is again widened, the hops arriving at this portion swell up again and are blown away by the cold air within the pipe 100 to be sent into the storage tank 3. As an alternative means in effecting air-locking with the screw conveyor, it is conceivable to reduce the diameter of pipe at its portion to be air-locked and/or reduce the pitch of screw. Either way, it suffices to see that the capacity between pitches at the air-locked portion is lessened and hop cones come to densely stuffed in the air-locked portion. Although a screw feeder is herein cited, as the means for conveying the material hop cones, any other appropriate means such as the locking means applied to other portions in the present invention is of course applicable as well.

Now, in the storage tank, the material hop cones must be intensely cooled down to a temperature required for facilitating the crushing. Therefore, in the case where, for instance, the temperature of the material hop cones supplied is −15° C and the temperature required for the crushing is −20° C, the temperature of the material hops must be lowered by the difference between the two. To meet this requirement, the storage tank is provided with another cooling pipeline wherein is to effected intense cooling-down to the required temperature. The pipeline comprising the air-cooler 17, pipe 103 and turbofan 18 illustrated in FIG. 2 serves as the cooling pipeline for this purpose.

Figure 4A:
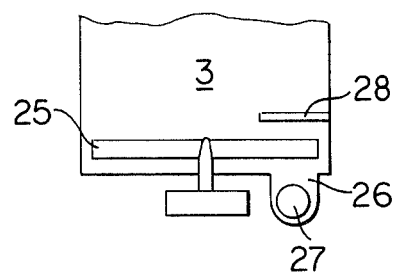
FIGS. 4A and 4B illustrate the lower part of said storage tank and the device for supplying frozen hop cones from the lower part of storage tank to the first crusher, respectively.
Figure 4B:
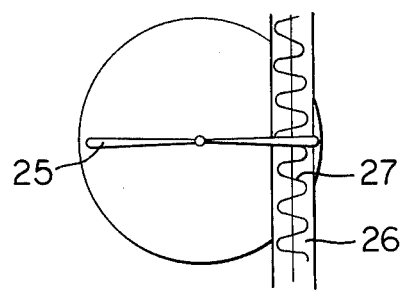

Taking-out of hop cones from the storage tank 3 in order to supply to the crusher 4 is performed as follows. Referring to FIGS. 4A and B, there is provided at the lower end of the storage tank 3 a stirring blade 25 devised to rotate slowly. Further, the bottom of the storage tank 3 is provided with an open groove 26 along one side of circumference thereof, and a screw conveyer 27 is accommodated therein. A brush installed above said groove 26 to correspond therewith is provided with a cover 28 which prevents the hop cones contained in the storage tank 3 from directly entering said screw conveyer 27. Accordingly, with slow rotation of the blades 25, the hops in the storage tank 3 enter the groove 26 and are conveyed to the crusher 4 by means of the screw conveyer 27, while there is no fear of the hop cones in the storage tank 3 being fed excessively by virtue of the protection by said cover 28.

Figure 5:
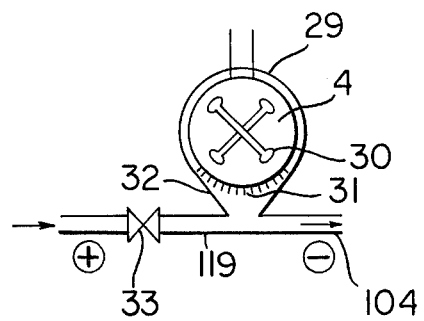
FIG. 5 illustrates — on an enlarged — the first crusher and the means for supplying crushed hops from said crusher to the pipeline for the purpose of transferring said crushed hops to a cyclone. DETAILED DESCRIPTION OF THE INVENTION Hop cones form a cluster wherein each cone consists of a stalk, 4 scaly bracts and a pair of bract leaves attached to every joint of the stalk, and at the inside root of every bract there are a couple of female flowers. As the cone ripens, lupulin glands grow and these are shaped like tiny cups at the base of bracteoles and stipular bracts or ovaries. The cups are filled with an oily resinous substance secreted from the lupulin glands, and the lupulin glands are called lupulin particles or simply lupulin.

Crushing of the hop cones conveyed from the storge tank 3 is performed by a crusher, such as the crusher 4 illustrated in FIG. 5. The crusher 4 exemplified herein is a hammer mill enclosed with a drum-shaped hull 29, which is equipped with a hammer 30 rotatable in said hull, and the lower part of the hull 29 communicates with the outside through the screen 31. This hammer mill is most popular; yet, even when a pin mill or a cutter mill is substituted therefor, there will be little difference functionally if the opening of screen is identical. The material hops crushed into a desired size flow out through screen, and pass through the passage 32 provided in between the screen 31 of the crusher and the pipe 119 to be blown away by the cold air suplied through the pipe 119 and sent into the cyclone 12 via the pipe 104. Generally, in the operation of a hammer mill, by virtue of centrifugal force of the rotating hammer, the fragments of crushed hops are taken out to the outside of system by way of the screen, but, in the inside of the crusher, by virtue of the whirlpool of air current arising from the rotation of crusher, hop fragments rub with one another, resulting in excessive crushing and superheating. Therefore, generally speaking, in the case of performing the crushing of hops (for the purpose of manufacturing a lupulin-rich hop) where it is desired to efffect a temperate crushing and avoid damages of lupulin due to overheating, a common hammer mill is unsuitable as the means for industrial or mass disposition of hops.

Taking this into consideration, the present invention is characterized in that the hop fragments produced by the rotation of hammer are quickly taken out of the crusher not only by utilizing centrifugal force of the crusher but also by additionally applying suction force of a jet of air which concurrently functions as the means for conveying hop fragments, whereby hop fragments coming out of the crusher can be definitely analyzed prior to sieving, rendering it possible to carry out an advanced industrial management. Jetting of cold air in the pipe 119 is generated by operating the valve disposed this side of the outlet for hop fragments coming out of the hammer mill as well as making an air suction means to be explained later on work on the side of the cyclone. The above mentioned jet generating means are, however, no more than examples of applicable means, that is, applicable means is of course not limited to the foregoing.

A mixture of cold air and hop fragments conveyed to the cyclone 12 is divided into solid matters and air current therein, and the cold air current containing dust is sent to a bag-filter 14 through the pipe 112. While, the solid matters separated in said cyclone 12 fall within the cyclone and are sent to the shaking sieve 5 through the air-lock 13.

The structure of said air-lock 13 is not particularly illustrated in the drawing, but it is of an ordinary type, that is, it has a drum-shaped frame and the empty inside thereof is airtightly divided into several uniform rooms by means of plural rotatable partitions. These partitions are devised to turn on the axis of said drum, and the capacity of each room is identical. Accordingly, when hop fragments coming from the cyclone enter a rotating room, said room charged with hop fragments shifts toward the airtight wall the the next empty room shifts to face the opening of the cyclone. In this way, rooms charged with hop fragments turn downward one after another and open into the passage 113 leading to the shaking sieve 5 thereby to let hop fragments fall into said shaking sieve. The shaking sieve 5 is a sieve provided with plural sieves having graduated meshes capable of shaking longitudinally. When said shaking sieve is a three-step shaking sieve and its final sieve is of 60-mesh, for instance, it will do to employ a 20-mesh sieve for the uppermost sieve and a 30-mesh sieve for the middle sieve. The yield which passed through the final sieve is sent to the lupulin receiver 7 by virtue of, for instance, dead load thereof. The portion which passed over the sieve of each step of the shaking sieve 5 fall from one edge of oscillatory sieve to be sent to the secondary crusher 4' by way of the pipe 114. Further, as the hop fragments fed to the shaking sieve 5 contain a considerable amount of relatively light and fine powder, this powder is supposed to be sent into a bag-filter through the pipe 114', and the exhaust from said bag-filter is sucked by the turbofan 21 to be discharged to the outside. This process of removing dust is conventional, but it is not mandatory in the present invention, that is, omission of this suction means would not have much bearing on the actual operation in the present invention.

Recrushing of siftings within the second crusher 4' is performed by practically the same device and same means as in the above described first crusher 4, and the mode of conveying the resulting fragments to the cyclone 12' by way of the pipe 104 is the same as in the case of the first crushing operation, excepting that the opening of screen of the crusher is finer than that of the first crusher by several millimeters. The function of the cyclone 12' is also identical with that of the cyclone 12, and the air separated thereby flows through the pipe 112', joins the air in the pipe 112, and is sent to the bag-filter 14. While, the solid matters fall from the cyclone, and are sent into the sieve 6 through the air-lock 13'. The function of this air-lock 13' is identical with that of the afore described air-lock 13.

The sieve 6 illustrated in FIG. 2 is a shaking sieve. This shaking sieve contains stratified plural sieves devised to turn eccentrically, and the meshes of said plural sieves are so graduated that the mesh of lower sieve is finer than that of higher sieve. For instance, in the case of a three-step shaking sieve, the top sieve is of 20-mesh, the middle sieve is of 30-mesh and the bottom sieve is of 60-mesh. The yield which passed through the bottom sieve, or final sieve, is sent into the lupulin receiver 7 by virtue of, for instance, dead load thereof. The siftings left on the sieves are put together and sent into the waste tank 10 through the pipe 109 and air-locker 8 by means of a blow generated by the air-blower 9. The waste fragments are supposed to be finally sent to the waste packer 11 by means of the screw conveyor 111.

The cold air coming out of the cyclones 12 and 12' is sent to the air bag filter 14 through the pipe 112 and the pipe 112' connected to said pipe 112, and further sent into the pipe 119 by the working of the turbofan 20. In the apparatus shown in FIG. 2, the air-cooler 19 for the pipe 119 is illustrated to have been disposed above the bag filter 14, but this is merely for the sake of explanation, and the position of said air-cooler 19 is not limited thereto, providing that the location of the air-cooler 19 is preferably in the vicinity of the turbofan 20 from the view point of facilitating the control of forced circulation of cold air. The re-cooled air coming from the pipe 119 is re-circulated for the purpose of conveying hop fragments coming out of the crusher 4, and a tributary thereof is used for conveying hop fragments produced in the crusher 4'.

As will be understood from the above descriptions, according to the present invention, inasmuch as air-locking is effected in various places, namely, air-locking in the material feeder for the storage tank, air-locking by the air-locker 13" for the cyclones 12, 12' and bag filter 14, air-locking by the air-locker 8 connected to the pipe 109 for the shaking sieve 6 and air-locking by the bag-filter for the exhaust from the shaking sieve, there is no fear of cold air leaking from the pipelines except for the loss of cold air going out together with products and waste, nor is there little infiltration of warm air into the cold air conveying pipelines.

Consequently, according ot the present invention, as long as a proper measure is taken for the purpose of keeping coldness of the pipelines, the degree of cooling necessary for continuing the operation suffices to be an equivalent of unavoidable loss of calories plus calories required for cooling the material hops, and therefore it is very profitable from the view point of economy in heat consumption.

In the apparatus of the present invention, what constitute particularly important factors thereof are the employment of two types of crushers whose screens are different from each other in width of opening thereof and the application of such cooling pipelines as expressed by thick lines in FIG. 2.

As to the width of opening of the screen for the first crusher, a screen having width of opening in the range of from 6 to 15 mm is applicable, but in the case of dealing with ordinary hops, the width of opening suffices to be about 10 mm at the most. As to the width of opening of the screen for the second crusher, it is advisable to make it be in the range of from 3 to 6 mm in disregard of the quality of hops. Besides, as elucidated in the foregoing, the width of opening of the screen of the second crusher is desirable to be narrower than that of the first crusher by 2 to 10 mm or thereabouts — preferably 2 to 5 mm or thereabouts.

Operation of the apparatus is to be performed under the condition that the temperture of the whole pipelines is below the freezing point of hops, e.g., a temperature lower than about $-5°$ C. In the case where crushing, sieving, etc. are performed at a temperature in the vicinity of $-20°$ C, the portion having the highest temperature in the cooling system attains to a temperature of about $-15°$ C. However, by taking proper adiabatic and air-locking measures, it is possible to maintain the temperature of whole pipelines to be relatively uniform and perform the operation securely.

As to the sieve, the above descriptions have been based on illustration of the case wherein an oscillatory sieve and a trommel sieve are respectively employed. From the practical point of view, however, both of the two sieves may be either oscillatory sieve or trommel sieve, or the order of said oscillatory sieve and trommel sieve in the embodiment in FIG. 2 may be reversed. The point is to see that the function of sieves to sift hop fragments be fulfilled with certainty.

It is desirable that such an apparatus as illustrated in FIG. 2 is operated in a room having been uniformly cooled at the time of operation. The temperature for operation can be a considerable low temperature; yet, it is advisable to keep it within the limits of about −40° C. If it is obliged to perform the operation at a temperature of −10° C or thereabouts, care must be taken lest any portion of the cooling system should rise to above the freezing point of hops.

When the present inventors experimentally constructed an apparatus of the same model as in FIG. 2 having an efficiency of dealing with 200 Kg of hops per hour and actually operated it under the condition of having a temperature of −20° C at its coldest portion, they could obtain practically the same results as shown in the foregoing example embodying the method of the present invention.

What is claimed is:

1. An apparatus for obtaining a lupulin-rich product from hop cones, which comprises: a storage tank for containing frozen hop cones, said storage tank having a feeder at the lower end thereof for feeding frozen hop cones from said storage tank; a first crusher connected for receiving frozen hop cones from said feeder, said first crusher having first crusher screen means whose openings are relatively large; a first cold air conveying pipe connected for receiving crushed fragments that pass through the screen means of said first crusher and for conveying said fragments in a cold air stream; a first cyclone connected to said first cold air conveying pipe for separating the cold air from the fragments; a first sieving device connected to said first cyclone for receiving said fragments that are discharged from said first cyclone, said first sieving device having first sieve screen means for separating the relatively large size fragments from the relatively small size fragments; a second crusher connected to said first sieving device for receiving therefrom the relatively large size fragments that are retained on said first sieve screen means and for re-crushing said relatively large size fragments, said second crusher having second crusher screen means whose openings are smaller than the openings of said first crusher screen means; a second cold air conveying pipe connected for receiving re-crushed fragments that pass through said screen means of said second crusher and for conveying said re-crushed fragments in a second cold air stream; a second cyclone connected to said second cold air conveying pipe for separating the cold air from the re-crushed fragments; and a second sieving device connected to said second cyclone for receiving said re-crushed fragments that are discharged from said second cyclone and having second seive screen means for separating the relatively large size re-crushed fragments from the relatively small size re-crushed fragments; said first and second cold air conveying pipes being part of a closed, cold air conveying system.

2. An apparatus according to claim 1, including a hopper for containing hop cones, a screw feeder for feeding hop cones from said hopper, a third cold air conveying pipe extending from the discharge end of said screw feeder to said storage tank, said screw feeder being disposed within an air-tight casing between said hopper and said third cold air conveying pipe, the discharge end of said screw feeder opening into an enlarged portion of said third cold air conveying pipe, said screw feeder having a portion of reduced volume between said hopper and said third cold air conveying pipe whereby the hop cones are compressed to provide an air-lock between said hopper and said third cold air conveying pipe.

3. An apparatus according to claim 1, wherein said storage tank is provided with a cooling pipeline comprising an air cooling device and an air suction device for circulating cold air through said storage tank.

4. An apparatus according to claim 1, wherein the lower end of said storage tank is provided with an outlet for the frozen hop cones, a cover disposed above said outlet, rotatable stirring blades disposed between said cover and said outlet for rotation above the bottom wall of said storage tank for moving the frozen hop cones to said outlet, said feeder for said first crusher being disposed beneath said outlet.

5. An apparatus according to claim 1, wherein at least one of said first and second cold air conveying pipes has a valve or contraction therein upstream of its associated crusher so that the crushed fragments are sucked from the crusher and are supplied to the following cyclone by a jet of cold air flowing through said cold air conveying pipe.

6. An apparatus according to claim 1, wherein one or both of said first and second sieving devices is a shaking or rotating plane sieve.

7. An apparatus according to claim 1, wherein one or both of said first and second sieving devices is a trommel sieve.

8. An apparatus according to claim 1, wherein an air inlet is disposed above said first sieving device to remove dust.

9. An apparatus according to claim 1, including a waste tank for storing the fragments which are retained on said second sieve screen means and an air-locked pipeline connected from said second sieving device to said waste tank.

10. An apparatus according to claim 1, including means to recycle the cold air coming out of said cyclones to said cold air conveying pipes.

11. An apparatus according to claim 10, wherein said refluxing means comprises an air suction device and cooling means for cooling the recycled air.

12. An apparatus according to claim 10, wherein an air-lock mechanism is provided in the pipeline of the product receiving means for the respective sieving devices.

13. An apparatus according to claim 1, in which the screen means of said first crusher have openings of a size of from 6 to 15 mm, the screen means of said second crusher have openings of a size of from 3 to 6 mm and also being from 2 to 10 mm smaller than the openings in the screen means of said first crusher, and said first and second sieving devices both have a sieve opening size of 60 mesh.

* * * * *

UNITED STATES PATENT AND TRADEMARK OFFICE
CERTIFICATE OF CORRECTION

PATENT NO. : 4 051 771

DATED : October 4, 1977

INVENTOR(S) : Junjiro Miyata and Yasushi Kikuchi

It is certified that error appears in the above-identified patent and that said Letters Patent are hereby corrected as shown below:

Column 14, line 56; change "10" to ---1---.

Signed and Sealed this

Fourteenth Day of March 1978

[SEAL]

Attest:

RUTH C. MASON
*Attesting Officer*

LUTRELLE F. PARKER
*Acting Commissioner of Patents and Trademarks*